Fig.3 Tripped

INVENTOR.
Elwood T. Platz
BY Daniel G. Mullen
Attorney

INVENTOR.
Elwood T. Platz
BY Daniel McCullen
Attorney

Aug. 19, 1952　　　　　E. T. PLATZ　　　　　2,607,867
CIRCUIT BREAKER

Filed Dec. 3, 1948　　　　　　　　　　　　　10 Sheets-Sheet 9

INVENTOR.
Elwood T. Platz
BY Daniel McCulley
Attorney

Aug. 19, 1952 E. T. PLATZ 2,607,867
CIRCUIT BREAKER

Filed Dec. 3, 1948 10 Sheets-Sheet 10

INVENTOR.
Elwood T. Platz
BY Daniel McCullen
Attorney

Patented Aug. 19, 1952

2,607,867

UNITED STATES PATENT OFFICE 2,607,867

CIRCUIT BREAKER

Elwood T. Platz, Detroit, Mich., assignor to Bulldog Electric Products Company, Detroit, Mich., a corporation of West Virginia Application December 3, 1948, Serial No. 63,410

16 Claims. (Cl. 200—89)

This application relates to circuit breakers, and particularly to circuit breakers having a control arrangement for connecting a manually operable handle or actuator to a contactor for opening and closing the circuit, with a latch whose automatic release automatically opens the circuit. The latch normally inhibits opening movement except when the latter is caused manually, as by movement of the handle.

It is a particular object of this invention to provide a novel form of control arrangement for such a manually operable circuit breaker.

It is a further object of the present invention to provide a circuit breaker wherein operation of the internal device that is responsive to over current conditions may be effected independently of the position of the external handle. This characteristic is sometimes referred to as "trip-free operation."

A further object is to provide a circuit breaker which will automatically relatch itself following an over-current condition.

The invention may be embodied in numerous forms. Two such are shown in the drawings. In one embodiment, shown in Figs. 1–11 of the drawings, there is shown a circuit breaker having three poles, with magnetic latch trip means. Figs. 12–13 show a breaker having but one pole, with a bimetal or thermal latch trip means.

For an understanding of the breakers herein disclosed, reference should be had to the appended drawings.

FIGS. 1–11

Figure 2:
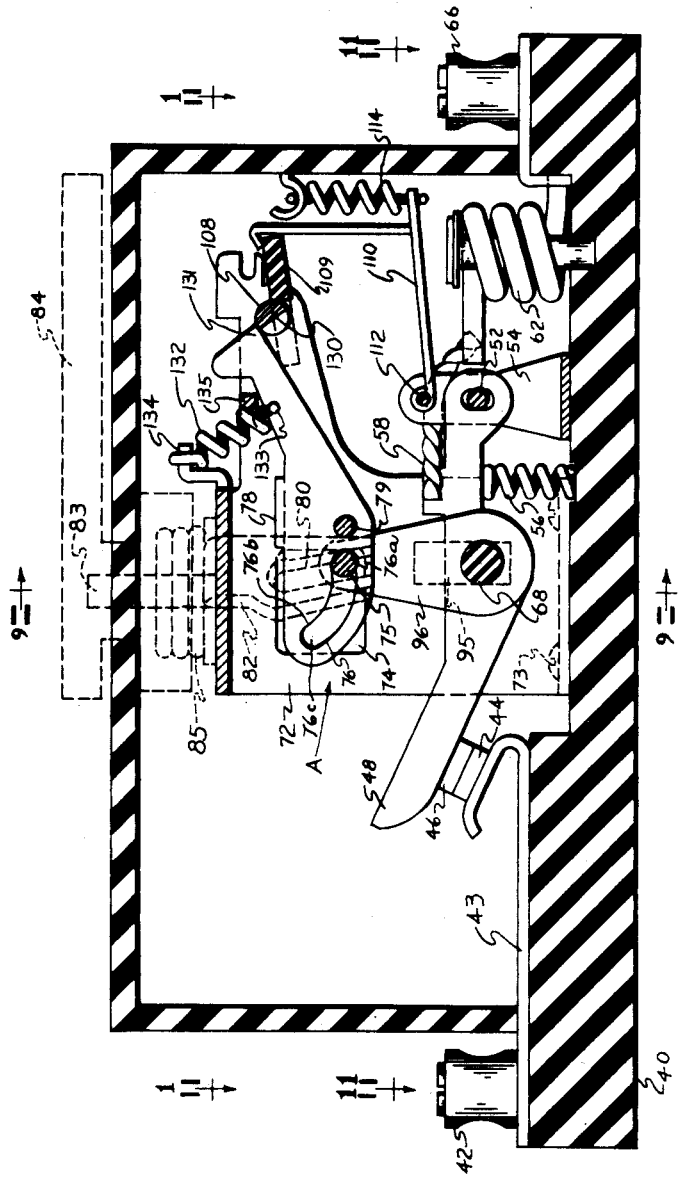
Figs. 2, 3 and 4 are sectional elevation views taken on line 2—2 of Fig. 1, showing the breaker parts in various positions, as indicated.
Figure 3:
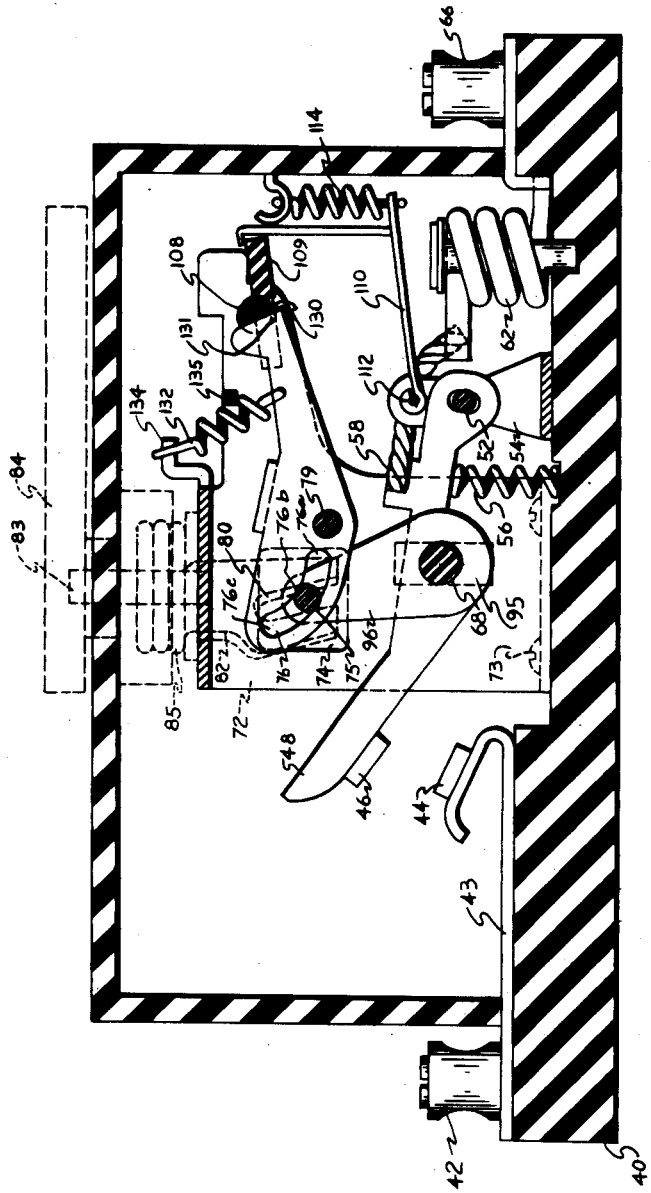
Figure 11:
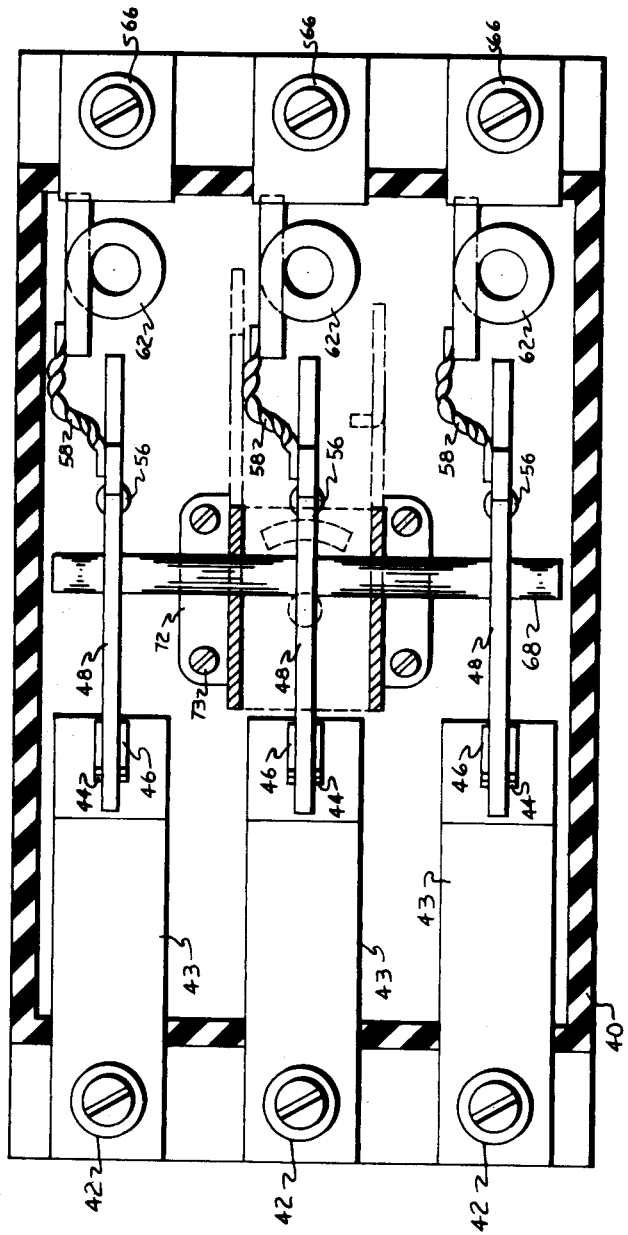
Fig. 11 is a sectional view as if on line 11—11, Fig. 2.

Referring to the drawings, it will be seen that Figs. 2 and 11 show a base 40 at the left end of which are mounted three terminal binding posts 42 connected by straps 43 to stationary contacts 44 adapted to be engaged by contact tips 46 of three vertically movable contactors 48 pivotally mounted by means of loose or lost motion pivots 52 on mounting lugs 54 and constantly urged up or clockwise by biasing springs 56 and connected by flexible connectors 58 to three electro-magnetic tripping coils 62 connected to three binding screws 66.

A transverse axle 68, suitably insulated from them, connects the three contactors 48 so that they may operate in unison in response to the control arrangement, generally referred to as "A," Fig. 2, which will now be described.

Figure 1:
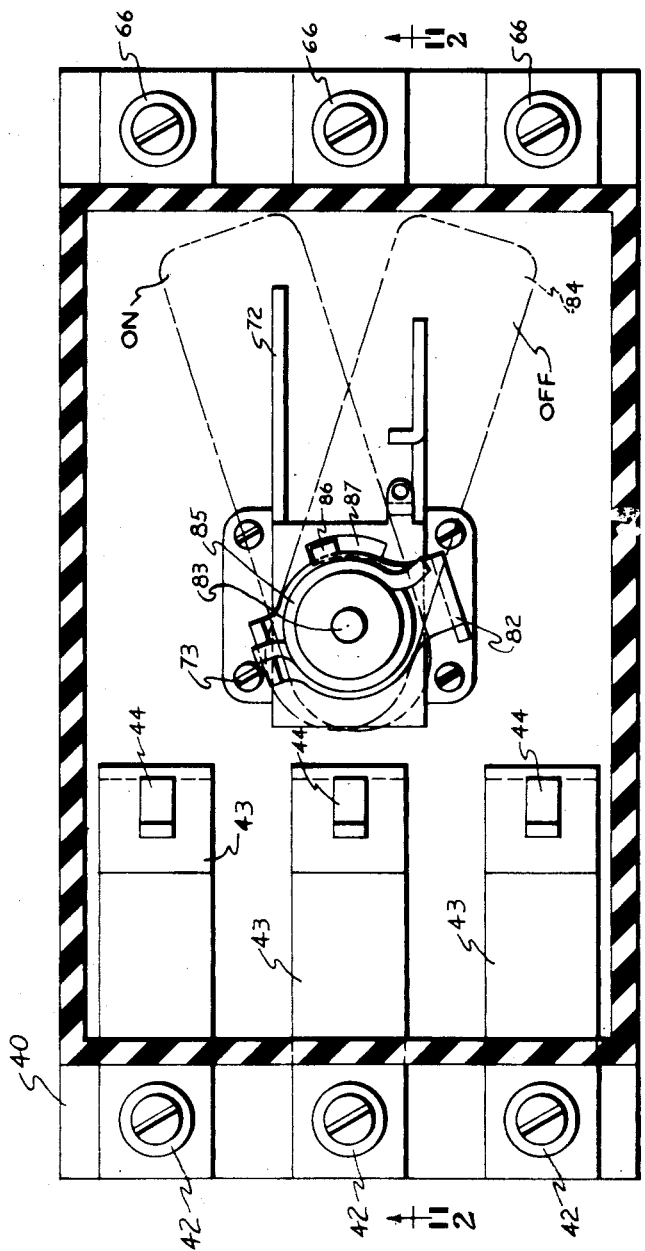
Fig. 1 is a sectional plan view of the breaker of Figs. 1–11, as if on line 1—1, Fig. 2.
Figure 5:
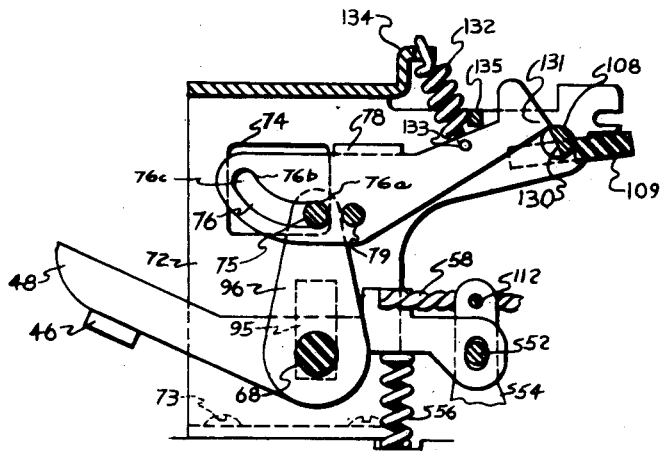
Figs. 5, 6, 7, 8 and 10 are fragmentary views of certain operating parts.
Figure 6:
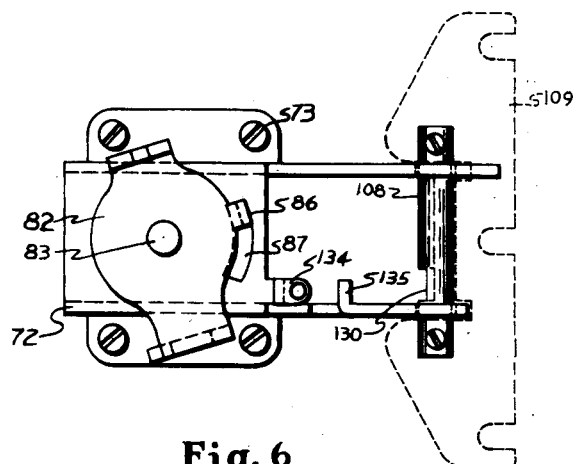
Figure 7:
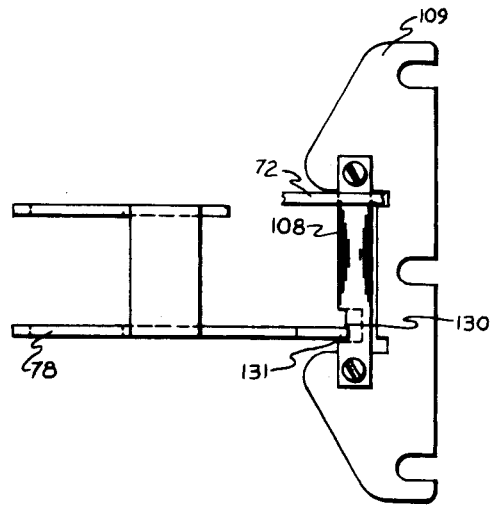
Figure 8:
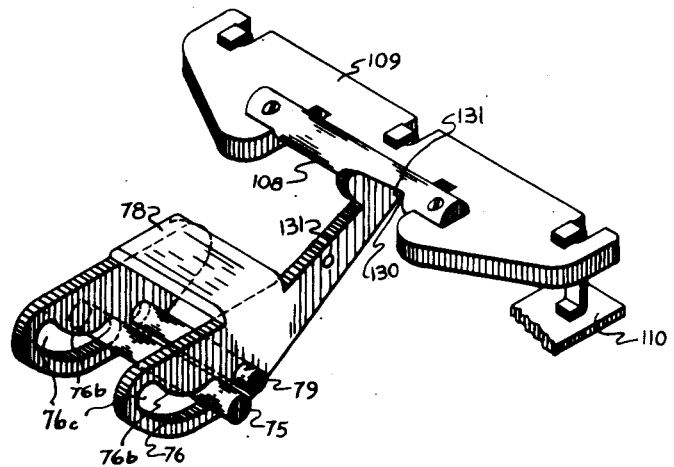
Figure 9:
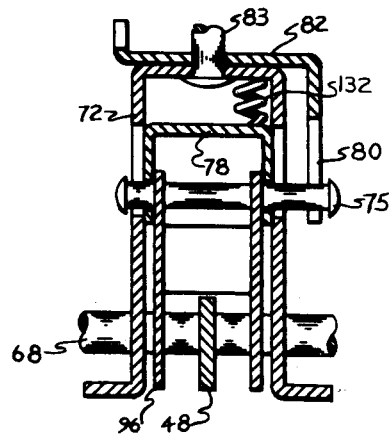
Fig. 9 is a sectional view as if on line 9—9 of Fig. 2.
Figure 10:
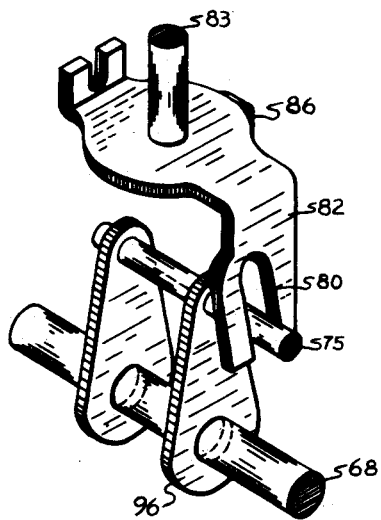

The control arrangement includes a U-shaped frame member 72, best shown in Figs. 5, 6 and 9, which is mounted on the base 40 by screws 73 and which has alined openings 74 through which passes a horizontally disposed movable shaft or pin 75, shown in Fig. 10, which also passes through camming slots 76 of a horizontally disposed latching arm 78, shown in Fig. 8, pivoted in the frame 72 at 79. Horizontal pin 75 also passes through a vertical slot 80 in a vertically disposed forked lever or actuating element 82 to which is integrally connected an operating shaft 83 in turn connected to a handle 84, through a quick make and break torsion spring 85. Forked lever 82 is mounted to rotate in a circular path as the handle 84 is moved horizontally, so that the lower end of lever 82 moves horizontally, and its rotation is limited by a lug 86 projecting down into an arcuate slot 87 cut out in the top portion of the frame 72, as shown in Figs. 1 and 6.

Axle 68 which passes through and connects the three contactors 48 also passes through vertically slotted portions 95 of the frame 72, as shown in Fig. 5, and is operatively connected to the lower end of a vertically arranged actuated element 98 on whose upper end is the horizontal pin 75.

Latching arm 78 is latched at an end by a latching bar 108, Fig. 8, which is journalled at its ends in the frame 72, Fig. 6, and has immovably fastened to it, as by screws at the ends of latch bar 108, a trip bar 109 of insulation. Loosely coiled around the latching bar 108 is a coil spring, not shown, tending to bias the assembly 108—109 counterclockwise, Fig. 2, to latching position. Loosely hooked around the edge of the trip bar 109 are three armatures 110, Fig. 2, for the three tripping electro-magnets 62. Armatures 110 are pivotally mounted on lugs 54 at 112, and are normally biased upwardly by springs 114. Latching bar 108 has a notch 130 which cooperates with the latched end 131 of latching arm 78 for releasing the latching arm 78, and the pin 75, and thus the mechanism as a whole.

When the latching bar 108 is in its latching position, Fig. 2, the latch extension 131 of the latching arm 78 is held up and prevented from moving down by the latch bar 108. In this way arm 78 is held immovable and thus holds pin 75 immovable and prevents the actuated element 96 and the contactors 48 from moving up unless the handle 84 is rotated.

However, when any trip magnet 62 is energized, it pulls down its armature 110 and rocks the trip bar 109 to rock the latching bar 108 clockwise to present notch 130 of the bar 108 to the end 131 of the latching arm 78, releasing the latter and permitting it to be free to be rocked clockwise on its pivotal axis 79. The freed arm 78 no longer holds the pin 75 immovable and permits the lifting of pin 75 and the element 96 and the contactors 48 by springs 56, without the actuating element 82 and the handle 84 being required to rotate, a trip free action.

A relatching and actuator returning spring 132 connects arm 78 at 133 to frame 72 at 134, and at 135 is shown a stop for limiting movement of arm 78 counterclockwise under the bias of such spring 132.

It will be noted that pivot 79 of arm 78 is nearer pin 75 than latch bar 108, so as to minimize latch pressure at 131—131 to be small in relation to the pressure of pin 75 on arm 78.

The circuit

The circuit from a terminal 42 to a binding post 66 includes the following parts: 42—43—44—46—48—58—62—66.

Operation

A. When the parts are in the "on" or closed circuit position, as shown in Fig. 2, and with arm 78 releasably latched at 130—131 by the latching bar 108, the horizontal pin 75 rests in the lower and horizontal portions 76a of the slots 76 of the arm 78. Thus the parts are held stable in the "on" position despite the bias of the springs 56 tending to move the contactors 48, the element 96 and, therefore, the horizontal pin 75 upwardly.

Since, for upward movement of the contactors 48, the horizontal pin 75 must move up, and since the pin 75 is held against such movement by arm 78 at 76a, the contactors 48 are held in the circuit closed position, against the biasing of springs 56 which bias them to the open circuit position.

B. When the handle or actuator 84 is rotated clockwise, as shown in Fig. 1, to the "off" position, the connection between it and the actuating element 82, established through the torsion spring 85, causes the lower end of element 82 and the horizontal pin 75 to move to the left, Fig. 2, with a quick break or snap action. Pin 75 is guided by the upper edge 76b of slot 76 of arm 78. As pin 75 moves to the left, springs 56 raise the contactors 48 to open the circuit.

Projection 86 of forked lever 82, Fig. 6, moving in a curved slot 87 in the top part of the frame 72 limits the extent of movement of the forked lever 82 and, therefore, the travel of the handle 84 as well as the horizontal pin 75. The latter is also stopped by the left end 76c of slot 76 in arm 78. Arm 78 cannot move since it is releasably held up by the latching bar 108.

Figure 4:
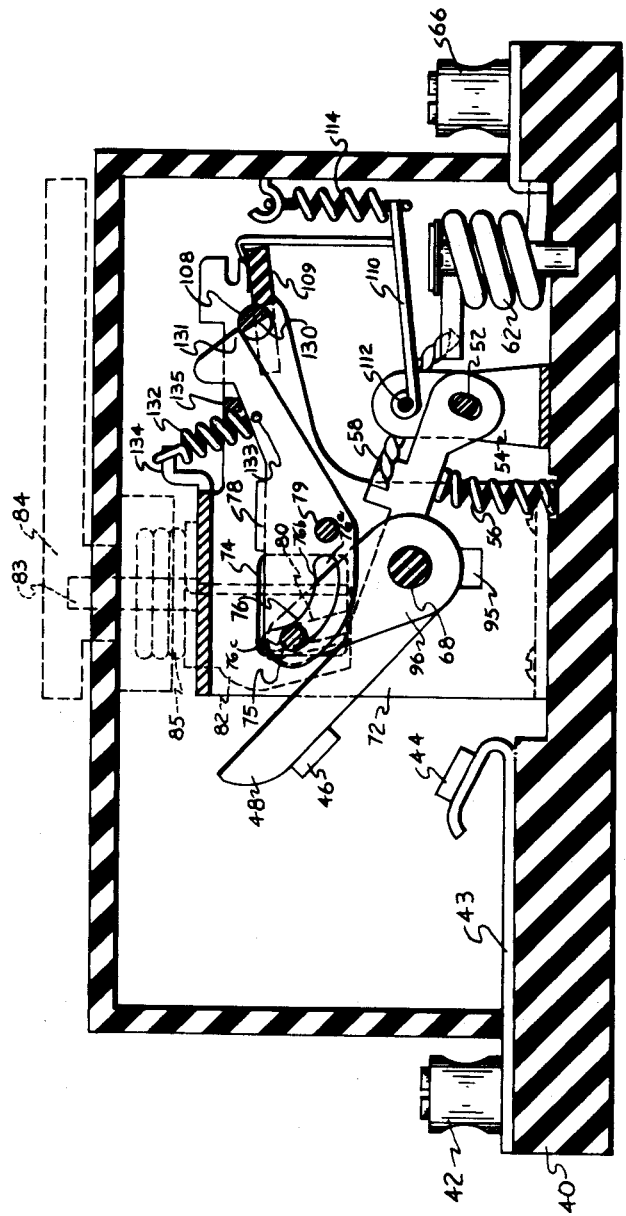

When the handle 84 is returned to the "on" position, Fig. 2, from the "off" position, Fig. 4, the forked lever 82 will be rotated counterclockwise, and in doing so will cause the horizontal pin 75 to move laterally to the right and down in the slot 76 of arm 78, with a quick make or snap action. In doing so the pin 75 will move the element 96 to the right and down, moving the contactors 48 back to the stationary contacts 44 and thus closing the circuit. All parts are now in the circuit closed position.

C. In the event of an overload in any pole, with the parts in the closed circuit position, the electro-magnet 62 of the overloaded pole will be energized to move its armature 110 down and thus move the trip bar 109 down to rotate the latch bar 108 so that notch 130 of the latch bar 108 is presented to the end 131 of the arm 78. Arm 78 is now free to pivot about its pivot 79 on the frame 72, and no longer holds pin 75. Springs 56 now move contactors 48 up. Element 96, which is fixed to the contactors 48 through the axle 58 will also move up, and in doing so will move the horizontal pin 75 up in the cut-out portion 80 of the forked lever 82. The horizontal pin 75 will rock arm 78 clockwise about its pivot 79 and the latching end 131, which is no longer releasably held by the latch bar 108, will pass down past notch 130 of latch bar 108, as the portion of arm 78 containing the slot 76 will move up with the horizontal pin 75.

Automatic relatching and actuator resetting

The latch return and actuator return spring 132, Fig. 5, thereupon exerts its influence on the arm 78 to rotate it counterclockwise about its pivot 79 to raise the latch end 131 of the arm 78 and at the same time to lower the slotted end of the arm 78. Latch end 131 of the arm 78 will rise until it is stopped by stop 135 of the frame 72. The slotted end of the arm 78 which contains the lateral pin 75 will be moved down. The upper edge of slot 76 will now cam pin 75 down and to the left, to the position of Fig. 4. Meanwhile the deenergized electro-magnet 62 will have allowed the armature 110 to move up and release the trip bar 109 to the action of the coil spring, not shown, which rotates the trip bar 109 and latch bar 108 so that the latch at 130—131 is reestablished. The movement terminates with the parts in the open circuit position and the arm 78 releasably relatched by the latch bar 108.

The actuating element 82 and the handle 84 meanwhile have been moved from the "on" to the "off" position due to the movement of pin 75 to the left responding to the influence of the latch return spring 132. All parts are now in the "off" position.

FIGS. 12–13

Although the invention has been shown in Figs. 1–11 in a three-pole embodiment, it is to be understood that it could just as easily have been embodied in a single-pole embodiment. To do this would merely require the shortening of the axle 68 as clearly shown in Fig. 13. The function of the breaker and the operation of the control arrangement would be exactly the same whether this breaker be single-pole or three-pole.

Figure 12:
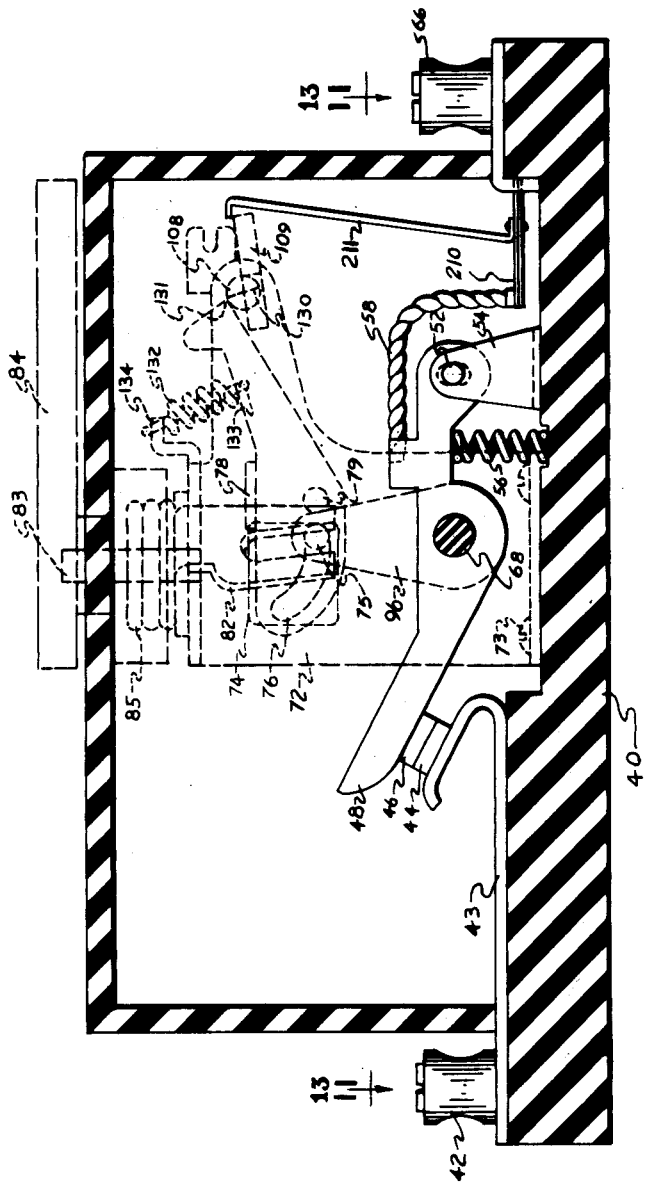
Fig. 12 is a sectional view of a single pole embodiment of the invention.
Figure 13:
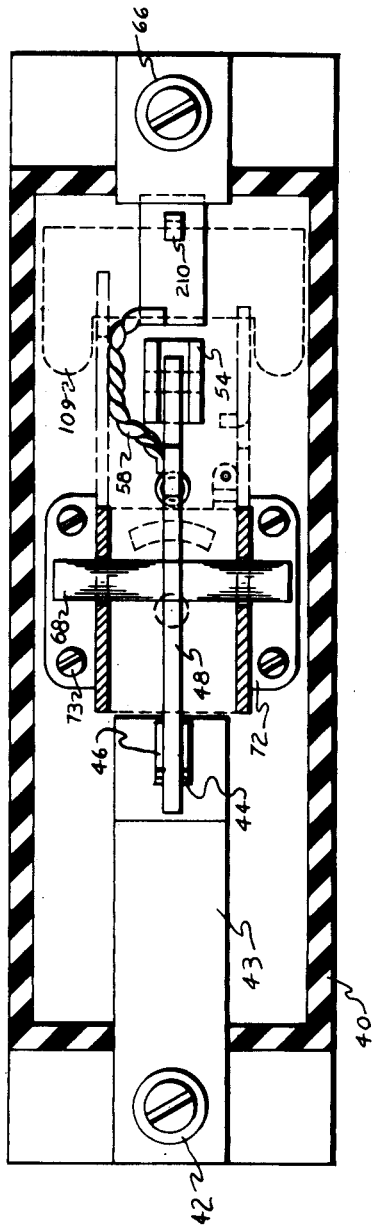
Fig. 13 is a sectional view as if on line 13—13, Fig. 12.

It is also to be understood that the means for controlling the latch bar 108 and trip bar 109 can either be electro-magnetic, as shown in Figs. 1–11, inclusive, or thermal or bimetal warping means, as shown in Figs. 12 and 13. Trip bar 109, which is normally urged upwardly by a coil spring, not shown, cooperates with a thermal bimetal strip 210 and hook 211, Figs. 12 and 13, when an overload occurs to release the latch at 130—131.

Now having described the circuit breakers herein disclosed, reference should be had to the claims which follow for a determination of the invention.

I claim:

1. In a circuit breaker, an actuating element mounted to have its lower end move in a given plane, and having its lower end slotted, an actuated element having its upper end provided with a pin passing through said slot of the actuating element, and mounted to have its lower end reciprocate but its upper end reciprocate and move arcuately, a spring for upwardly biasing the actuated element, a contactor operatively connected to said actuated element and arranged to move to open circuit position as the lower end of said actuated element moves upwardly, and to return to closed circuit position as such end moves downwardly, and a latching arm pivotally mounted between its ends and releasably latched at one end and having a slot at its other end receiving said pin, the end of the latching arm slot nearer the pivot forming an abutment for holding said pin in its circuit closed position, and the edge of the latching arm slot providing a track to guide the movement of said pin to and from said end of the latching arm slot, and also providing a means whereby movement of said pin under bias of said spring upwardly in the slot of the actuating element, due to release of said latching arm by its latch, causes said latching arm to rock on its pivot out of its pin holding position, and also providing a means whereby movement of said latching arm back to its pin holding position after movement of said arm due to movement of said pin out of arm-held position causes said pin to move to circuit open position, and means for holding said pin in its circuit open position.

2. In a circuit breaker, an actuating element mounted to have its lower end move in a given plane, and having its lower end slotted, an actuated element having its upper end provided with a pin passing through said slot of the actuating element, and mounted to have its lower end reciprocate but its upper end reciprocate and move arcuately, a spring for upwardly biasing the actuated element, a contactor operatively connected to said actuated element and arranged to move to open circuit position as the lower end of said actuated element moves upwardly, and to return to closed circuit position as such end moves downwardly, and a latching arm pivotally mounted between its ends and releasably latched at one end and having a slot at its other end receiving said pin, the end of the latching arm slot nearer the pivot forming an abutment for holding said pin in its circuit closed position, and the edge of the latching arm slot providing a track to guide the movement of said pin to and from said end of the latching arm slot, and also providing a means whereby movement of said pin under bias of said spring upwardly in the slot of the actuating element, due to release of said latching arm by its latch, causes said latching arm to rock on its pivot out of its pin holding position, and also providing a means whereby movement of said latching arm back to its pin holding position after movement of said arm due to movement of said pin out of arm-held position causes said pin to move to a circuit open position, and means for holding said pin in its circuit open position, and a spring for moving said latching arm back to its pin holding position.

3. In a circuit breaker, an actuating element mounted to have its lower end move in a given plane, and having its lower end slotted, an actuated element having its upper end provided with a pin passing through said slot of the actuating element, and mounted to have its lower end reciprocate but its upper end reciprocate and move arcuately, a spring for upwardly biasing the actuated element, a contactor operatively connected to said actuated element and arranged to move to open circuit position as the lower end of said actuated element moves upwardly, and to return to closed circuit position as such end moves downwardly, and a latching arm pivotally mounted between its ends and releasably latched at one end and having a slot at its other end receiving said pin, the end of the latching arm slot nearer the pivot forming an abutment for holding said pin in its circuit closed position, and the edge of the latching arm slot providing a track to guide the movement of said pin to and from said end of the latching arm slot, and also providing a means whereby movement of said pin under bias of said spring upwardly in the slot of the actuating element, due to release of said latching arm by its latch, causes said latching arm to rock on its pivot out of its pin holding position, and also providing a means whereby movement of said latching arm back to its pin holding position after movement of said arm due to movement of said pin out of arm-held position causes said pin to move to a circuit open position, and means for holding said pin in its circuit open position, the slot in the latching arm having its end nearer the latching arm pivot considerably below the end more remote from the latching arm pivot.

4. In a circuit breaker, an actuating element mounted to have its lower end move in a given plane, and having its lower end slotted, an actuated element having its upper end provided with a pin passing through said slot of the actuating element, and mounted to have its lower end reciprocate but its upper end reciprocate and move arcuately, a spring for upwardly biasing the actuated element, a contactor operatively connected to said actuated element and arranged to move to open circuit position as the lower end of said actuated element moves upwardly, and to return to closed circuit position as such end moves downwardly, and a latching arm pivotally mounted between its ends and releasably latched at one end and having a slot at its other end receiving said pin, the end of the latching arm slot nearer the pivot forming an abutment for holding said pin in its circuit closed position, and the edge of the latching arm slot providing a track to guide the movement of said pin to and from said end of the latching arm slot, and also providing a means whereby movement of said pin under bias of said spring upwardly in the slot of the actuating element, due to release of said latching arm by its latch, causes said latching arm to rock on its pivot out of its pin holding position, and also providing a means whereby movement of said latching arm back to its pin holding position after movement of said arm due to movement of said pin out of arm-held position causes said pin to move to a circuit open position, and means for holding said pin in its circuit open position, the slot in the latching arm having its end nearer the latching arm pivot considerably below the end more remote from the latching arm pivot, and a spring for moving said latching arm back to its pin holding position.

5. In a circuit breaker, an actuating element mounted to have its lower end move in a given plane, and having its lower end slotted, an actuated element having its upper end provided with a pin passing through said slot of the actuating element, and mounted to have its lower end reciprocate but its upper end reciprocate and move arcuately, a spring for upwardly biasing the actuated element, a contactor operatively connected to said actuated element and arranged to move to open circuit position as the lower end of said actuated element moves upwardly, and to return to closed circuit position as such end moves downwardly, and a latching arm pivotally mounted between its ends and releasably latched at one end and having a slot at its other end receiving said pin, the ends of the latching arm slot providing two abutments for holding said pin in its circuit closed and open positions, and the edge of the latching arm slot providing a track for guiding the movement of said pin to and from the ends of the latching arm slot, and also providing a means whereby movement of said pin under bias of said spring upwardly in the slot of the actuating element due to the release of said latching arm by its latch, causes said latching arm to rock on its pivot out of its pin holding position, and also providing a means whereby movement of said latching arm back to its pin holding position after movement of said arm due to movement of said pin out of arm-held position causes said pin to move to a circuit open position, again held by an end of the latching arm slot.

6. In a circuit breaker, an actuating element mounted to have its lower end move in a given plane, and having its lower end slotted, an actuated element having its upper end provided with a pin passing through said slot of the actuating element, and mounted to have its lower end reciprocate but its upper end reciprocate and move arcuately, a spring for upwardly biasing the actuated element, a contactor operatively connected to said actuated element and arranged to move to open circuit position as the lower end of said actuated element moves upwardly, and to return to closed circuit position as such end moves downwardly, and a latching arm pivotally mounted between its ends and releasably latched at one end and having a slot at its other end receiving said pin, the ends of the latching arm slot providing two abutments for holding said pin in its circuit closed and open positions, and the edge of the latching arm slot providing a track for guiding the movement of said pin to and from the ends of the latching arm slot, and also providing a means whereby movement of said pin under bias of said spring upwardly in the slot of the actuating element, due to the release of said latching arm by its latch, causes said latching arm to rock on its pivot out of its pin holding position, and also providing a means whereby movement of said latching arm back to its pin holding position after movement of said arm due to movement of said pin out of arm-held position causes said pin to move to a circuit open position, again held by an end of the latching arm slot, and a spring for moving said latching arm back to its pin holding position.

7. In a circuit breaker, an actuating element mounted to have its lower end move in a given plane, and having its lower end slotted, an actuated element having its upper end provided with a pin passing through said slot of the actuating element, and mounted to have its lower end reciprocate but its upper end reciprocate and move arcuately, a spring for upwardly biasing the actuated element, a contactor operatively connected to said actuated element and arranged to move to open circuit position as the lower end of said actuated element moves upwardly, and to return to closed circuit position as such end moves downwardly, and a latching arm pivotally mounted between its ends and releasably latched at one end and having a slot at its other end receiving said pin, the ends of the latching arm slot providing two abutments for holding said pin in its circuit closed and open positions, and the edge of the latching arm slot providing a track for guiding the movement of said pin to and from the ends of the latching arm slot, and also providing a means whereby movement of said pin under bias of said spring upwardly in the slot of the actuating element due to the release of said latching arm by its latch, causes said latching arm to rock on its pivot out of its pin holding position, and also providing a means whereby movement of said latching arm back to its pin holding position after movement of said arm due to movement of said pin out of arm-held position causes said pin to move to a circuit open position, again held by an end of the latching arm slot, the slot in the latching arm having its end nearer the latching arm pivot considerably below the end more remote from the latching arm pivot.

8. In a circuit breaker, an actuating element mounted to have its lower end move in a given plane, and having its lower end slotted, an actuated element having its upper end provided with a pin passing through said slot of the actuating element, and mounted to have its lower end reciprocate but its upper end reciprocate and move arcuately, a spring for upwardly biasing the actuated element, a contactor operatively connected to said actuated element and arranged to move to open circuit position as the lower end of said actuated element moves upwardly, and to return to closed circuit position as such end moves downwardly, and a latching arm pivotally mounted between its ends and releasably latched at one end and having a slot at its other end receiving said pin, the ends of the latching arm slot providing two abutments for holding said pin in its circuit closed and open positions, and the edge of the latching arm slot providing a track for guiding the movement of said pin to and from the ends of the latching arm slot, and also providing a means whereby movement of said pin under bias of said spring upwardly in the slot of the actuating element, due to the release of said latching arm by its latch, causes said latching arm to rock on its pivot out of its pin holding position, and also providing a means whereby movement of said latching arm back to its pin holding position after movement of said arm due to movement of said pin out of arm-held position causes said pin to move to a circuit open position, again held by an end of the latching arm slot, the slot on the latching arm having its end nearer the latching arm pivot considerably below the end more remote from the latching arm pivot, and a spring for moving said latching arm back to its pin holding position.

9. In a circuit breaker, a vertically arranged actuating element mounted to have its lower end move in a horizontal plane, and having its lower end slotted in a vertical plane, an actuated element arranged in a vertical plane and having its upper end provided with a pin passing through said slot of the actuating element, and mounted to have its lower end reciprocate but its upper end reciprocate and move arcuately, a spring for upwardly biasing the lower end of the actuated element, a contactor operatively connected to said actuated element and arranged to move to open circuit position as the lower end of said actuated element moves upwardly, and to return to closed circuit position as such end moves downwardly, and a latching arm arranged in a horizontal plane and pivotally mounted between its ends and releasably latched at one end and having a slot at its other end receiving said pin, the end of the latching arm slot nearer the pivot forming an abutment for holding said pin in its circuit closed position, and the edge of the latching arm slot providing a track for guiding movement of said pin to and from said end of the latching arm slot, and also providing a means whereby movement of said pin under bias of said spring upwardly in the slot of the actuating element, due to release of said latching arm by its latch, causes said latching arm to rock on its pivot out of its pin holding position, and also providing a means whereby movement of said latching arm back to its pin holding position after movement of said arm due to movement of said pin out of arm-held position causes said pin to move to a circuit open position, and means for holding said pin in its circuit open position.

10. In a circuit breaker, a vertically arranged actuating element mounted to have its lower end move in a horizontal plane, and having its lower end slotted in a vertical plane, an actuated element arranged in a vertical plane and having its upper end provided with a pin passing through said slot of the actuating element, and mounted to have its lower end reciprocate but its upper end reciprocate and move arcuately, a spring for upwardly biasing the lower end of the actuated element, a contactor operatively connected to said actuated element and arranged to move to open circuit position as the lower end of said actuated element moves upwardly, and to return to closed circuit position as such end moves downwardly, and a latching arm arranged in a horizontal plane and pivotally mounted between its ends and releasably latched at one end and having a slot at its other end receiving said pin, the end of the latching arm slot nearer the pivot forming an abutment for holding said pin in its circuit closed position, and the edge of the latching arm slot providing a track for guiding movement of said pin to and from said end of the latching arm slot, and also providing a means whereby movement of said pin under bias of said spring upwardly in the slot of the actuating element, due to release of said latching arm by its latch, causes said latching arm to rock on its pivot out of its pin holding position, and also providing a means whereby movement of said latching arm back to its pin holding position after movement of said arm due to movement of said pin out of arm-held position causes said pin to move to a circuit open position, and means for holding said pin in its circuit open position, and a spring for moving said latching arm back to its pin holding position.

11. In a circuit breaker, a vertically arranged actuating element mounted to have its lower end move in a horizontal plane, and having its lower end slotted in a vertical plane, an actuated element arranged in a vertical plane and having its upper end provided with a pin passing through said slot of the actuating element, and mounted to have its lower end reciprocate but its upper end reciprocate and move arcuately, a spring for upwardly biasing the lower end of the actuated element, a contactor operatively connected to said actuated element and arranged to move to open circuit position as the lower end of said actuated element moves upwardly, and to return to closed circuit position as such end moves downwardly, and a latching arm arranged in a horizontal plane and pivotally mounted between its ends and releasably latched at one end and having a slot at its other end receiving said pin, the end of the latching arm slot nearer the pivot forming an abutment for holding said pin in its circuit closed position, and the edge of the latching arm slot providing a track for guiding movement of said pin to and from said end of the latching arm slot, and also providing a means whereby movement of said pin under bias of said spring upwardly in the slot of the actuating element, due to release of said latching arm by its latch, causes said latching arm to rock on its pivot out of its holding position, and also providing a means whereby movement of said latching arm back to its pin holding position after movement of said arm due to movement of said pin out of arm-held position causes said pin to move to a circuit open position, and means for holding said pin in its circuit open position, the slot in the latching arm having its end nearer the latching arm pivot considerably below the end more remote from the latching arm pivot.

12. In a circuit breaker, a vertically arranged actuating element mounted to have its lower end move in a horizontal plane, and having its lower end slotted in a vertical plane, an actuated element arranged in a vertical plane and having its upper end provided with a pin passing through said slot of the actuating element, and mounted to have its lower end reciprocate but its upper end reciprocate and move arcuately, a spring for upwardly biasing the lower end of the actuated element, a contactor operatively connected to said actuated element and arranged to move to open circuit position as the lower end of said actuated element moves upwardly, and to return to closed circuit position as such end moves downwardly, and a latching arm arranged in a horizontal plane and pivotally mounted between its ends and releasably latched at one end and having a slot at its other end receiving said pin, the end of the latching arm slot nearer the pivot forming an abutment for holding said pin in its circuit closed position, and the edge of the latching arm slot providing a track for guiding movement of said pin to and from said end of the latching arm slot, and also providing a means whereby movement of said pin under bias of said spring upwardly in the slot of the actuating element, due to release of said latching arm by its latch, causes said latching arm to rock on its pivot out of its pin holding position, and also providing a means whereby movement of said latching arm back to its pin holding position after movement of said arm due to movement of said pin out of arm-held position causes said pin to move to a circuit open position, and means for holding said pin in its circuit open position, the slot in the latching arm having its end nearer the latching arm pivot considerably below the end more remote from the latching arm pivot, and a spring for moving said latching arm back to its pin holding position.

13. In a circuit breaker, a vertically arranged actuating element mounted to have its lower end move in a horizontal plane, and having its lower end slotted in a vertical plane, an actuated element arranged in a vertical plane and having its upper end provided with a pin passing through said slot of the actuating element, and mounted to have its lower end reciprocate but its upper end reciprocate and move arcuately, a spring for upwardly biasing the lower end of the actuated element, a contactor operatively connected to said actuated element and arranged to move to open circuit position as the lower end of said actuated element moves upwardly, and to return to closed circuit position as such end moves downwardly, and a latching arm arranged in a horizontal plane and pivotally mounted between its ends and releasably latched at one end and having a slot at its other end receiving said pin, the ends of the latching arm slot providing two abutments for holding said pin in its circuit closed and open positions, and the edge of latching arm slot providing a track for guiding the movement of said pin to and from the ends of the latching arm slot, and also providing a means whereby movement of said pin under bias of said spring upwardly in the slot of the actuating element, due to release of said latching arm by its latch, causes said latching arm to rock on its pivot out of its pin holding position, and also providing a means whereby movement of said latching arm back to its pin holding position after movement of said arm due to movement of said pin out of arm-held position causes said pin to move to a circuit open position, again held by an end of the latching arm slot.

14. In a circuit breaker, a vertically arranged actuating element mounted to have its lower end move in a horizontal plane, and having its lower end slotted in a vertical plane, an actuated element arranged in a vertical plane and having its upper end provided with a pin passing through said slot of the actuating element, and mounted to have its lower end reciprocate but its upper end reciprocate and move arcuately, a spring for upwardly biasing the lower end of the actuated element, a contactor operatively connected to said actuated element and arranged to move to open circuit position as the lower end of said actuated element moves upwardly, and to return to closed circuit position as such end moves downwardly, and a latching arm arranged in a horizontal plane and pivotally mounted between its ends and releasably latched at one end and having a slot at its other end receiving said pin, the ends of the latching arm slot providing two abutments for holding said pin in its circuit closed and open positions, and the edge of latching arm slot providing a track for guiding the movement of said pin to and from the ends of the latching arm slot, and also providing a means whereby movement of said pin under bias of said spring upwardly in the slot of the actuating element, due to release of said latching arm by its latch, causes said latching arm to rock on its pivot out of its pin holding position, and also providing a means whereby movement of said latching arm back to its pin holding position after movement of said arm due to movement of said pin out of arm-held position causes said pin to move to a circuit open position, again held by an end of the latching arm slot, and a spring for moving said latching arm back to its pin holding position.

15. In a circuit breaker, a vertically arranged actuating element mounted to have its lower end move in a horizontal plane, and having its lower end slotted in a vertical plane, an actuated element arranged in a vertical plane and having its upper end provided with a pin passing through said slot of the actuating element, and mounted to have its lower end reciprocate but its upper end reciprocate and move arcuately, a spring for upwardly biasing the lower end of the actuated element, a contactor operatively connected to said actuated element and arranged to move to open circuit position as the lower end of said actuated element moves upwardly, and to return to closed circuit position as such end moves downwardly, and a latching arm arranged in a horizontal plane and pivotally mounted between its ends and releasably latched at one end and having a slot at its other end receiving said pin, the ends of the latching arm slot providing two abutments for holding said pin in its circuit closed and open positions, and the edge of latching arm slot providing a track for guiding the movement of said pin to and from the ends of the latching arm slot, and also providing a means whereby movement of said pin under bias of said spring upwardly in the slot of the actuating element, due to release of said latching arm by its latch, causes said latching arm to rock on its pivot out of its pin holding position, and also providing a means whereby movement of said latching arm back to its pin holding position after movement of said arm due to movement of said pin out of arm-held position causes said pin to move to a circuit to open position, again held by an end of the latching arm slot, the slot in the latching arm having its end nearer the latching arm pivot considerably below the end more remote from the latching arm pivot.

16. In a circuit breaker, a vertically arranged actuating element mounted to have its lower end move in a horizontal plane, and having its lower end slotted in a vertical plane, an actuated element arranged in a vertical plane and having its upper end provided with a pin passing through said slot of the actuating element, and mounted to have its lower end reciprocate but its upper end reciprocate and move arcuately, a spring for upwardly biasing the lower end of the actuated element, a contactor operatively connected to said actuated element and arranged to move to open circuit position as the lower end of said actuated element moves upwardly, and to return to closed circuit position as such end moves downwardly, and a latching arm arranged in a horizontal plane and pivotally mounted between its ends and releasably latched at one end and having a slot at its other end receiving said pin, the ends of the latching arm slot providing two abutments for holding said pin in its circuit closed and open positions, and the edge of latching arm slot providing a track for guiding the movement of said pin to and from the ends of the latching arm slot, and also providing a means whereby movement of said pin under bias of said spring upwardly in the slot of the actuating element, due to release of said latching arm by its latch, causes said latching arm to rock on its pivot out of its pin holding position, and also providing a means whereby movement of said latching arm back to its pin holding position after movement of said arm due to movement of said pin out of arm-held position causes said pin to move to a circuit open position, again held by an end of the latching arm slot, the slot in the latching arm having its end nearer the latching arm pivot considerably below the end more remote from the latching arm pivot, and a spring for moving said latching arm back to its pin holding position.

ELWOOD T. PLATZ.

REFERENCES CITED

The following references are of record in the file of this patent:

UNITED STATES PATENTS

| Number | Name | Date |
| --- | --- | --- |
| 1,761,117 | Getchell | June 3, 1930 |
| 1,952,040 | Frank et al. | Mar. 20, 1934 |
| 2,103,070 | Frank | Dec. 21, 1937 |
| 2,160,236 | Taylor | May 30, 1939 |
| 2,270,150 | Taylor | Jan. 13, 1942 |
| 2,354,157 | Swingle | July 18, 1944 |